United States Patent

[11] 3,557,660

| [72] | Inventor | Kenneth Percival Palmer |
| | | Barford, England |
| [21] | Appl. No. | 771,935 |
| [22] | Filed | Oct. 30, 1968 |
| [45] | Patented | Jan. 26, 1971 |
| [73] | Assignee | Joseph Lucas, (Industries) Limited |
| | | Birmingham, England |

[54] SPEED SENSING AND CONTROLLING APPARATUS
6 Claims, 3 Drawing Figs.

[52] U.S. Cl. .................................................. 91/3, 91/51, 91/52; 137/81.5
[51] Int. Cl. .................................................. F15b 13/042
[50] Field of Search ........................................... 91/51, 3, 52(Cursory); 137/81.5(Cursory)

[56] References Cited
UNITED STATES PATENTS
3,233,522  2/1966  Stern ............................. 137/81.5

2,729,751  1/1956  Westman ......................... 91/51

FOREIGN PATENTS
874,370  5/1942  France ........................... 91/51

*Primary Examiner*—Paul E. Maslousky
*Attorney*—Holman, Glascock, Downing & Seebold ABSTRACT: Apparatus for sensing and controlling the speed of a rotating part comprising means for providing a pulsating-fluid pressure related to the speed of the part, two devices to which the pulsating pressure is applied, said devices being capable of vibrating at different resonant frequencies, two passage means communicating with a common supply means of the fluid at a steady pressure, the passage means having outlets controlled by the positions of the two devices respectively to vary the pressure in said passage means, and control means whereby the speed of the part can be varied in accordance with the difference in pressure in the passage means respectively, equality of pressures in the two passage means being possible when the devices are vibrating with their amplitudes equal.

PATENTED JAN 26 1971

INVENTOR
Kenneth Percival Palmer
BY
ATTORNEYS

SPEED SENSING AND CONTROLLING APPARATUS

This invention relates to apparatus for sensing the speed of a shaft or other rotating part, the apparatus providing a signal to control means whereby the speed of said shaft can be varied in the event of deviation of the speed from a predetermined value. Such apparatus can, for example, be used in controlling the speed of an internal combustion engine, such as a gas turbine.

The object of the present invention is to provide apparatus of the kind referred to in a convenient form.

In accordance with the present invention apparatus for sensing and controlling the speed of a rotating part comprises in combination, means for providing a fluid pressure pulsating at a rate related to the speed of the part, two devices to which the pulsating pressure is applied, said two device being capable of vibrating under the influence of the pressure pulses and being designed to resonate at different frequencies, to two passage means, a common supply means for supplying fluid under steady pressure to both said passages means, a said passage means having outlets arranged to be controlled by the positions of said two devices respectively, to vary the pressure in said passage means respectively, and control means whereby the speed of the part can be varied in accordance with any difference in pressure in said passage means respectively, the arrangement in use being such that there will only be equality of pressures in said two passage means when the two devices are vibrating with their amplitudes equal.

The invention will now be described by waY of example with reference to the accompanying drawings in which.

Figure 1:
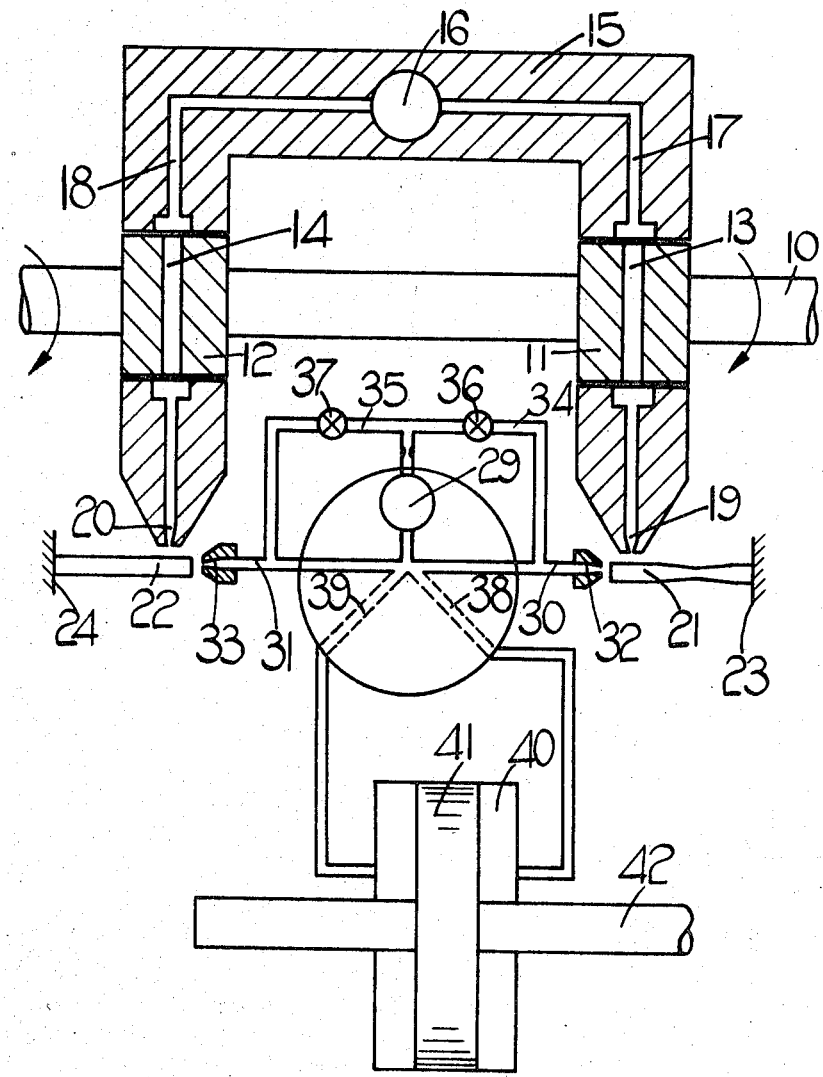
FIG. 1 illustrates diagrammatically an apparatus for controlling the speed of a shaft in an internal combustion engine.

With reference to the construction shown in FIG. 1, there is provided a shaft 10 the speed of which is to be controlled. This shaft may, for example, be driven by a gas turbine engine and the apparatus is intended to control the speed of this shaft at a predetermined value.

The shaft carries two discs 11, 12 having diametrically extending passages 13, 14 respectively.

The discs 11, 12 are disposed with within a body diagrammatically illustrated at 15 to which fluid is admitted at a substantially steady pressure, through an inlet 16.

A passage 17 in the body 15 has respective sections at opposite sides of the disc 11 and a passage 18 is similarly disposed with respect to the disc 12. The sections of these passages 17, 18 only communicate when the passages 13, 74 are in the positions shown. At all other angular positions of the shaft 10 and the discs 11, 12, communication between the sections of the passages 17, 18 is cut off.

The opposite end of the passages 17, 18 terminate in respective nozzles 19, 20, disposed adjacent to devices 21, 22 respectively.

The devices 21, 22 are reeds, each of which has one of its ends fixed to a body indicated at 23, 24 respectively.

Thus far described, the device operates as follows. The supply of fluid at a steady pressure at the inlet 16 ensures this steady pressure in those portions of the passages 17, 18 upstream of the discs 11, 12. Since the shaft 10 is rotating, the pressure in the portions of the passages 17, 18 downstream of the discs 11, 12 will pulsate at a speed which is dependent upon the speed of the shaft 10, and therefore of the associated engine to which it is connected.

Figure 2:
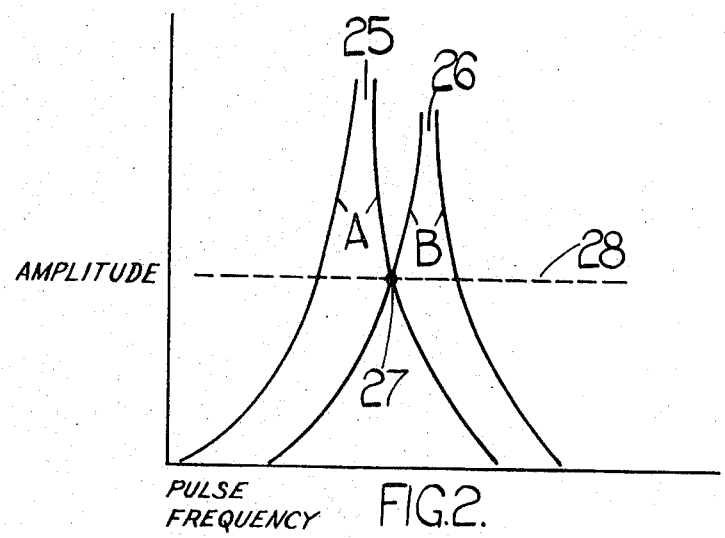
FIG. 2 is a graphic representation of the frequencies of oscillation of the resonating devices of FIG. 1.

The nozzle 19, 20 will therefore discharge fluid pulses at the frequency related to the shaft speed, towards the reeds 21, 22 respectively, which will thus be caused to vibrate. The reeds 21, 22 are, however, designed as to shape or dimension such that their natural resonant frequencies differ, though these frequencies are closely similar. FIG. 2 illustrates the relationship of the two resonant frequencies.

In FIG. 2 the two sets of curves A and B represent the vibrations of the reeds 21, 22 respectively. The base represents pulse frequency and the vertical scale is amplitude.

The points 25, 26 represent the resonant frequencies of the reeds 21, 22 respectively, and it will be observed that the curves overlap and coincide at a single point 27.

The apparatus is so designed that the point 27 corresponds to a shaft speed at which it is to be controlled.

At a frequency corresponding to the point 27 the amplitude of vibration of the reeds 21, 22 will also be the same, this being represented in FIG. 2 by the dotted line 28.

The apparatus also includes a further constant fluid supply inlet 29, communicating with a pair of passages 30, 31 respectively, terminating in respective nozzles 32, 33. The nozzles 32, 33 are disposed adjacent to the reeds 21, 22 respectively and flow from the supply inlet 29 escaping from the nozzles 32, 33 is controlled by the vibration of the reeds 21, 22 respectively, the pressure in the passages 30, 31 fluctuating with the reed vibrations. Accordingly, it is only when the amplitudes of the vibrations of the reeds 21, 22 are equal, represented by the line 28 in FIG. 2, that the mean pressures in the passages 30, 31 are equal.

Further passages 34, 35, incorporating respective restrictors 36, 37 afford communication between the inlet 29 and the passages 30, 31 respectively, at positions adjacent to, but upstream of, the nozzles 32, 33 respectively.

The junction between the passages 30, 31 and the passage from the inlet 29 also has two further passages 38, 39 leading from it, these passages 38, 39 being equally inclined with respect to the passage from the inlet 29, and are arranged at acute angles with respect to the passages 30, 31 respectively.

The fluid proportional amplifier is only illustrated in diagrammatic form and it is to be understood that other fluid proportional amplifiers can be used to perform this function.

The passages 38, 39 communicate with opposite ends of a cylinder 40 in which is disposed a piston 41.

The piston 41 is connected to a rod 42 which, in this example, is connected to means for regulating the fuel flow to the associated engine and therefore for regulating its speed.

When the mean pressures in the passages 30, 31 are equal, the mean pressures in the passages 38, 39 will also be equal, so that the piston 41 will be stationary in its cylinder 40. Any deviation from the predetermined speed of the shaft 10 will vary the frequency of vibration of the reeds 21, 22 thus varying the mean pressures in the passages 30, 31. A corresponding change will take place in the passages 30, 31. A corresponding change will take place in the passages 38, 39 so that there will be a mean pressure difference across the piston 41 tending to move this in an appropriate direction to restore the engine to the speed at which it is to be controlled.

If, for example, the speed of the shaft increases, the frequency of vibration of the reeds 21, 22 will be such that there is created a greater pressure in the passage 31 than exists in the passage 30. A greater pressure will exist in the passage 38 than in the passage 39. This causes the piston 41 to move to the left as shown in FIG. 1 and the effect of this will be to decrease the fuel supply to the engine so that the shaft speed will again reduce to the steady conditions in which the pressures on the piston 41 are equal. If the speed of the shaft decreases, an opposite change in pressures will occur and the piston 41 will move to the right. The associated mechanism (not shown) is arranged under these circumstances to increase the fuel supply so that the shaft speed will increase.

Figure 3:
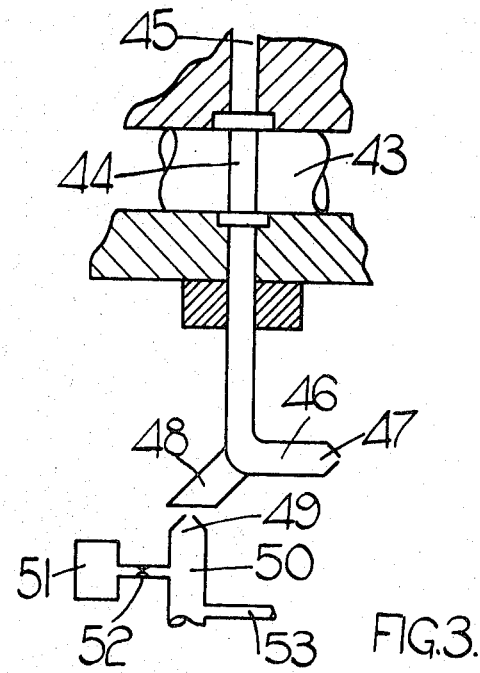
FIG. 3 is a fragmentary view of an alternative arrangement.

FIG. 3 illustrates, in part, an alternative form of apparatus in which the shaft, which is to be controlled is indicated at 43. This shaft has a transverse drilling 44 which affords communication between two portions of a passage 45 supplied with fluid under pressure from an inlet (not shown). The portion of the passage 45 downstream of the shaft 43, terminates in an L-shaped hollow reed 46, the end of which is provided with a nozzle 47.

This reed vibrates at the frequency of the pulses of the fluid flowing therethrough, and a knife 48 attached to the heel of the reed 46 is arranged to control the outlet nozzle 49 of a passage 50 to which fluid is supplied from a source indicated at 51.

The passage 50 has a restrictor 52 and communicates with a further passage 53 at the side of the restrictor 52 remote from the nozzle 49.

The arrangement is such that the amplitude of cyclic pressure in the passage 53 is controlled by the frequency of vibration of the reed 46, and is connected to a device such as that indicated at 31, 32 in FIG. 1, for providing a signal controlling the speed of the shaft 43.

The control includes two of the assemblies shown in FIG. 3, arranged in similar manner to the corresponding elements in FIG. 1.

Means may also be provided whereby the resonant frequencies of the vibrating devices can be varied, to provide for changes in speed at which governing takes place.

I claim:

1. Apparatus for sensing and controlling the speed of a rotating part comprising, in combination, means for providing a fluid pressure pulsating at a rate related to the speed of the part, two devices to which the pulsating pressure is applied, said two devices being capable of vibrating under the influence of the pressure pulses and being designed to resonate at different frequencies, two passage means, a common supply means for supplying fluid under steady pressure to both said passage means, said passage means having outlets arranged to be controlled by the positions of said two devices respectively, to vary the pressure in passage means respectively, and control means whereby the speed of the part can be varied in accordance with any difference in pressure in said passage means respectively, the arrangement in use being such that there will only be equality of pressures in said two passage means when the two devices are vibrating with their amplitudes equal.

2. Apparatus as claimed in claim 1 in which the means for providing a pulsating fluid pressure comprises a source of fluid at steady pressure, a body defining a passage through which the fluid passes, said passage being divided into two separated portions, a disc carried by the rotating part, and the disc having a passage which, at one angular position, affords communication between the separated portions of the passage in the body.

3. Apparatus as claimed in claim 1 in which the devices comprise reeds at which the pulsating fluid is directed in use, the reeds being designed so that their resonant frequencies differ but are in the same range.

4. Apparatus as claimed in claim 3 in which the passage means terminate in respective nozzles which are disposed adjacent to the reed ends respectively.

5. Apparatus as claimed in claim 1 in which the control means is a piston and cylinder unit, opposite ends of which communicate with the passage means respectively.

6. Apparatus as claimed in claim 1 in which the devices comprise L-shaped hollow reeds to the interior of which the pulsating pressure is applied, the reeds carrying respective knives which control the outlets of the passage means respectively.